United States Patent
Burger et al.

(10) Patent No.: US 10,425,243 B2
(45) Date of Patent: Sep. 24, 2019

(54) COMMISSIONING DEVICE FOR COMMISSIONING INSTALLED BUILDING TECHNOLOGY DEVICES

(71) Applicants: TRIDONIC GMBH & CO KG, Dornbirn (AT); ZUMTOBEL LIGHTING INC., Highland, NY (US)

(72) Inventors: Matthias Burger, Bregenz (AT); Karl Jonsson, Rancho Santa Margarita, CA (US); Christan Moormann, Hamburg (DE); Stephane Vasse, Mäder (AT)

(73) Assignees: TRIDONIC GMBH & CO KG, Dornbirn (AT); ZUMTOBEL LIGHTING INC., Highland, NY (US)

( * ) Notice: Subject to any disclaimer, the term of this patent is extended or adjusted under 35 U.S.C. 154(b) by 0 days.

(21) Appl. No.: 15/746,038

(22) PCT Filed: Aug. 1, 2016

(86) PCT No.: PCT/IB2016/054614
§ 371 (c)(1),
(2) Date: Jan. 19, 2018

(87) PCT Pub. No.: WO2017/025854
PCT Pub. Date: Feb. 16, 2017

(65) Prior Publication Data
US 2018/0212793 A1 Jul. 26, 2018

Related U.S. Application Data

(60) Provisional application No. 62/202,425, filed on Aug. 7, 2015.

(51) Int. Cl.
*H04B 10/00* (2013.01)
*H04L 12/28* (2006.01)
(Continued)

(52) U.S. Cl.
CPC .......... *H04L 12/2809* (2013.01); *G06T 7/593* (2017.01); *H05B 37/0272* (2013.01);
(Continued)

(58) Field of Classification Search
USPC ......................................... 398/172
See application file for complete search history.

(56) References Cited

U.S. PATENT DOCUMENTS 7,415,212 B2 * 8/2008 Matsushita ............. G06F 3/002
250/206.1
9,192,019 B2 * 11/2015 Huizenga ............... H05B 37/02
(Continued)

FOREIGN PATENT DOCUMENTS

WO 2005084339 9/2005

OTHER PUBLICATIONS

PCT Search Report in parent application PCT/IB2016/054614 dated Dec. 8, 2016.

*Primary Examiner* — Agustin Bello
(74) *Attorney, Agent, or Firm* — Andrus Intellectual Property Law

(57) ABSTRACT

The invention provides a commissioning device for commissioning building technology devices, in particular operating devices for lighting means, the commissioning device comprising at least one optical sensor, in particular a 3D camera, configured to obtain images containing spatial information of three dimensions and to receive optical communication signals emitted from a building technology device, at least one processing unit configured to process received optical communication signals and to process the spatial images. The at least one processing unit is configured to compute spatial position of the building technology device by processing the produced spatial images and by evaluating the spatial information, wherein the at least one
(Continued)

processing unit is configured to process the optical communication signals received from the building technology device in order to obtain information identifying the building technology device, and wherein the at least one processing unit is configured to associate the computed spatial position of the building technology device with the processed visual signals.

9 Claims, 3 Drawing Sheets

(51) Int. Cl.
  *H05B 37/02* (2006.01)
  *G06T 7/593* (2017.01)
  *H04B 10/116* (2013.01)
(52) U.S. Cl.
  CPC .. *G06T 2207/10012* (2013.01); *H04B 10/116* (2013.01); *H04L 2012/2841* (2013.01)

(56) References Cited

U.S. PATENT DOCUMENTS

| | | | |
|---|---|---|---|
| 9,331,779 B2* | 5/2016 | Oshima | H04B 10/1143 |
| 2006/0053447 A1 | 3/2006 | Krzyanowski et al. | |
| 2011/0018911 A1* | 1/2011 | Kitaoka | G09G 3/003 |
| | | | 345/690 |
| 2011/0202151 A1 | 8/2011 | Covaro et al. | |
| 2012/0154195 A1* | 6/2012 | Nystrom | H04N 21/4131 |
| | | | 341/176 |
| 2013/0030589 A1* | 1/2013 | Pessina | H05B 37/0272 |
| | | | 700/295 |
| 2013/0134891 A1 | 5/2013 | Woytowitz | |
| 2013/0221203 A1* | 8/2013 | Barrilleaux | G01J 1/0403 |
| | | | 250/208.2 |
| 2015/0219765 A1* | 8/2015 | Mead | H01S 3/06754 |
| | | | 356/5.09 |
| 2015/0248789 A1* | 9/2015 | Abovitz | G06K 9/00671 |
| | | | 345/633 |
| 2015/0248791 A1* | 9/2015 | Abovitz | G06K 9/00671 |
| | | | 345/633 |
| 2015/0248793 A1* | 9/2015 | Abovitz | G06K 9/00671 |
| | | | 345/633 |
| 2016/0191158 A1* | 6/2016 | Aoyama | H04B 10/1149 |
| | | | 398/172 |
| 2016/0191159 A1* | 6/2016 | Aoyama | H04N 21/436 |
| | | | 398/172 |
| 2016/0352421 A1* | 12/2016 | Oshima | H04B 10/11 |
| 2017/0099102 A1* | 4/2017 | Oshima | H04B 10/11 |
| 2017/0105129 A1* | 4/2017 | Teplin | H04W 24/02 |
| 2017/0123390 A1* | 5/2017 | Barco | G05B 15/02 |
| 2017/0195046 A1* | 7/2017 | Cheon | H04B 10/073 |
| 2017/0230114 A1* | 8/2017 | Kim | H04B 10/1143 |
| 2017/0244483 A1* | 8/2017 | Oshima | H04B 10/116 |
| 2017/0290132 A1* | 10/2017 | Amrine | H05B 33/0845 |
| 2018/0027386 A1* | 1/2018 | Zampini, II | H04W 4/043 |
| | | | 370/311 |
| 2018/0027630 A1* | 1/2018 | DeJonge | H05B 33/0815 |
| | | | 315/86 |
| 2018/0088208 A1* | 3/2018 | Gagrani | G02B 7/09 |
| 2018/0098215 A1* | 4/2018 | Roberts | H04W 12/06 |
| 2018/0132335 A1* | 5/2018 | Jonsson | H05B 37/0272 |

* cited by examiner

COMMISSIONING DEVICE FOR COMMISSIONING INSTALLED BUILDING TECHNOLOGY DEVICES

CROSS REFERENCE TO RELATED APPLICATIONS

The present application is the U.S. national stage application of International Application PCT/IB2016/054614, filed Aug. 1, 2016, which international application was published on Feb. 16, 2017 as International Publication WO 2017/025854 A1. The International Application claims priority to U.S. Provisional Application 62/202,425 filed Aug. 7, 2015.

FIELD OF THE INVENTION

The invention relates to a commissioning device for commissioning building technology devices (after their installation in a building) and in particular operating devices for lighting means and a method for operating the commissioning device. In particular, the invention relates to a commissioning device for commissioning LED based luminaires.

BACKGROUND OF THE INVENTION

Commissioning, which is the process of associating a physical position of an installed building technology device with a logical (e.g. bus or network) address thereof is an essential step during the installation and setup of an intelligent lighting system, for example a light management system. The commissioning step typically requires electric, electronic and/or software expertise by the staff installing the light system. This makes the installation costly due to the needed staff qualification. During the commissioning process dedicated software is used to assign an address and/or a geographical position to a building technology device. Afterwards, a grouping of the building technology devices and/or an association with a work flow definition, e.g. a scene definition, is performed.

To facilitate the commissioning, the environment (e.g. floor, room, location in the room) where a building technology device is installed needs to be found in order to specifically operate the building technology device based on its position in the environment, and to allow a location based management of the building technology device. The locations information or positions of the building technology devices is especially required to allow their visualization, e.g. to allow a management by a graphical user interface visualizing the devices on a plan of the environment, e.g. on a floor or building plan.

Also, the building technology devices to be commissioned commonly need to be equipped with a communication component that is able to communicate with a commissioning tool, which typically uses wireless communication to communicate with each building technology device. The commissioning tool can then be used to read or set and address for the building technology device and read or configure operating parameters. Moreover, the commissioning tool can associate a position with the address of a building technology device.

However, this type of commissioning requires a one-two-one-communication between the commissioning tool and each building technology device and also rises extra costs as the building technology devices not only need to be provided with the communication component, but also with additional means to allow control and configuration by the "wireless commissioning" functionality. A definition of a location of a building technology device, e.g. based on a floor, building or room plan still needs to be performed manually.

SUMMARY OF THE INVENTION

The invention aims at elevating these problems and to allow a quick commissioning of building technology devices. Therefore, the invention provides a system and method described herein.

In a first aspect, a commissioning device for commissioning building technology devices, in particular operating devices for lighting means, is provided the commissioning device comprising at least one optical sensor, in particular a 3D camera, configured to obtain images containing spatial information of three dimensions and to receive optical communication signals emitted from a building technology device, and at least one processing unit configured to process received optical communication signals and to process the spatial images. The at least one processing unit is configured to compute a spatial position of the building technology device by processing the produced spatial images and by evaluating the spatial information, wherein the at least one processing unit is configured to process the optical communication signals received from the building technology device in order to obtain information identifying the building technology device, and wherein the at least one processing unit is configured to associate the computed spatial position of the building technology device with the processed visual signals.

The commissioning device can be a communication terminal, e.g. a Smartphone or tablet.

The at least one processing unit can process and in particular decode the received optical communication signals.

The optical communication signals can be visual light communication signals.

The optical communication signals emitted by the building technology device may include an address of the building technology device, in particular an IP address and/or a lighting bus address.

The at least one processing unit further can associate the associated information with a location in a, preferably digital, building plan, stored in a storage unit functionally connected to the at least one processing unit.

The commissioning device may comprise a positioning sensor, e.g. a global positioning sensor and/or a compass.

The commissioning device can be configured to determine an absolute position, an orientation of the commissioning device, evaluate an output of the positioning sensor and/or is configured to associate the associated information with an absolute position.

The building technology device can be a luminaire.

The optical sensor can be a stereo camera and/or a range camera.

The commissioning device can comprise a communication interface for wired and/or wireless communication.

In another aspect, a method for commissioning building technology devices, in particular operating devices for lighting means, is provided, wherein at least one optical sensor, in particular a 3D camera, obtaining images containing spatial information of three dimensions and/or to receive optical communication signals emitted from a building technology device, and at least one processing unit processes received optical communication signals and processes the spatial images. The at least one processing unit computes a spatial position of the building technology device by processing the produced spatial images and by evaluating the spatial information, wherein the at least one processing unit processes the optical communication signals received from the building technology device in order to obtain information identifying the building technology device, and wherein the at least one processing unit associates the computed spatial position of the building technology device with the processed optical communication signals.

In yet another aspect, a lighting system comprising at least one building technology device, in particular an operating device for lighting means, and a commissioning device according to claim 1 is provided, wherein the commissioning device preferably outputs the associated information to a central processing unit via a communication interface, further comprising a storage unit functionally connected to the commissioning device.

BRIEF DESCRIPTION OF THE DRAWINGS

The invention is also described with reference to the figures. In particular
FIG. 1 exemplarily illustrates principles of the invention.

DETAILED DESCRIPTION

To assign a location of a building technology device to its address, a commissioning device with an optical sensor is used. The location can either be a relative or absolute geographical location or position in an environment, e.g. a building. The building technology device preferably is a luminaire or an operating device for lighting means. The commissioning device in particular is configured with other sensors such as a orientation sensor, a sensor for obtaining a geographical information (GPS, GLONASS, Galileo, . . . ), a temperature sensor and/or a compass, but may also comprise communication interfaces for wireless and/or wire bound communication.

As obtaining geographical information to determine a geographical location (e.g. by receiving a GPS signal) indoors might be difficult, a wireless interface can be used to determine a position of the commissioning device based on a cell tower, base station or wireless access point position (e.g. WiFi/WLAN access points or routers). Specifically, the optical sensor is a 3D camera such as a stereoscopic camera or range camera. The optical sensor is used to obtain images which contain spatial information. In particular, a communication terminal such as a smart phone or tablet with e.g. a stereoscopic camera can be used for commissioning.

Figure 1:
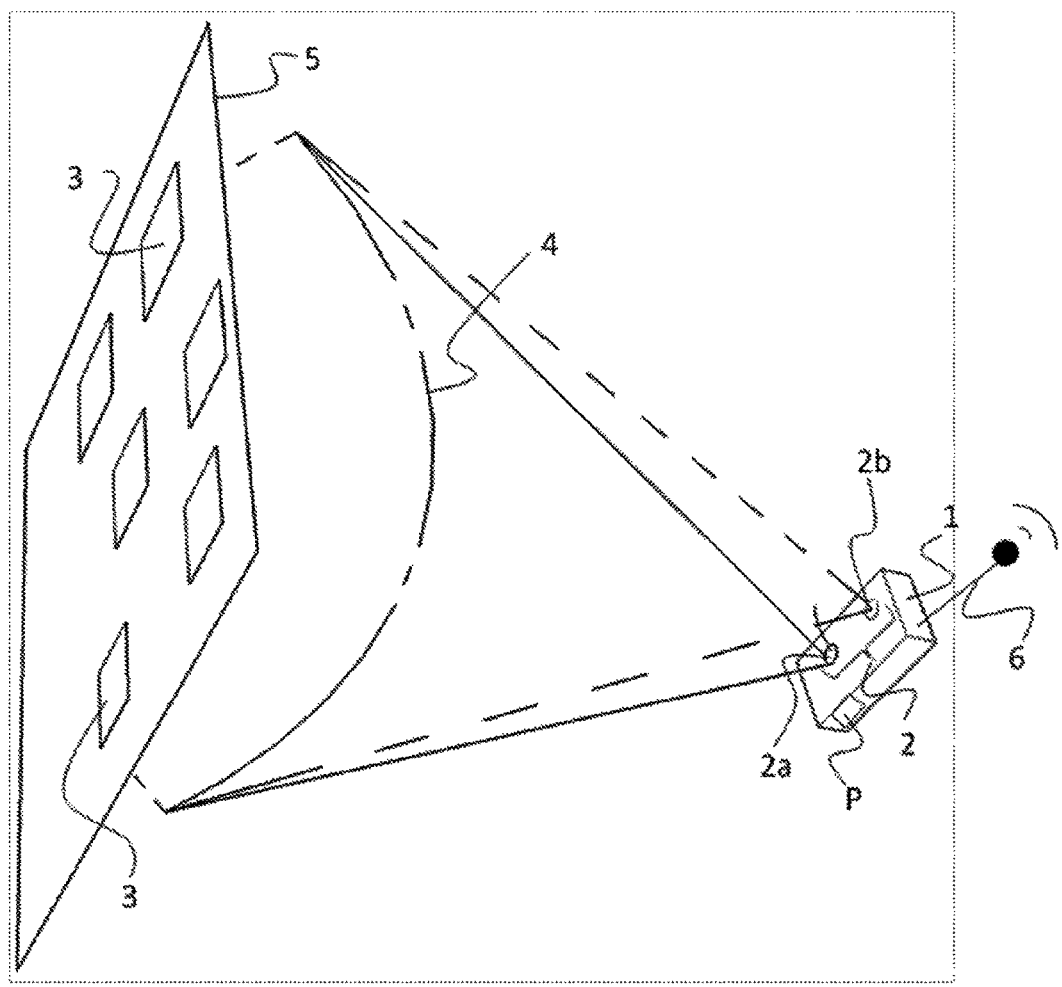

FIG. 1 exemplarily shows the principal idea of the inventive concept. A commissioning device 1 comprises at least one optical sensor 2. The at least one optical sensor 2 is directed to a number of building technology devices 3. An area 4 observed by the optical sensor 2 is illustrated by the broken line circle. The building technology devices 3 can for example be arranged on a wall or ceiling 5. Preferably, the optical sensor 2 is an optical 3d camera. The optical sensor 2 can therefore be configured with a first optical lens 2a and a second optical lens 2b. The second optical lens 2b observes the same area 4 from a slightly different angle (indicated by dashed lines) as the first optical lens 2a, to e.g. produce a stereoscopic image of the observed area 4. The sensor 2 hence can be a 3d camera with two or more lenses with a separate image sensor element or (digital or electronic) film frame for each lens. This allows the optical sensor 2 to simulate human binocular vision, and therefore gives it the ability to capture three-dimensional images. This process is known as stereo photography.

The optical sensor 2 may be used for range imaging or stereo triangulation and for determining the depth to points in the observed area 4. Range imaging based on stereo triangulation can usually produce reliable depth estimates for a subset of all points visible to the optical sensor 2. The measurement can be passive and there is no need for special conditions in terms of scene illumination. The distance between the lenses can be about the distance between one's eyes though a longer base line produces more extreme 3-dimensionality.

The commissioning device 1 comprises the at least one processing unit P which alone or together with an image processing software computes a spatial position of a building technology device 3 by processing the produced spatial images and by evaluating the spatial information. In Particular, processing unit P and/or the image processing software evaluates the three dimensional information contained in the images obtained by the optical sensor 2. The software also assigns or matches the position of each building technology device 3 in the obtained images to e.g. a position based on a local reference point or geographical positioning, but preferably relative to each other.

The commissioning device therefore can use an information form a geographical information system but may also employ other means for determining a position. Moreover, the determined position of a building technology device can be matched to a position in a building or floor plan electronically available, in particular when the plan is stored in a storage unit of the commissioning device. If there is more than one building technology device in the observed area, the processing unit P and/or the image processing software for processing the obtained images can extract the position of each building technology device by applying image filters. The relative position of the building technology devices is determined and their shape may be detected. Also a database for common shapes of building technology devices can be made available and the commissioning tool can be functionally connected thereto. A communication interface 6 is also shown in FIG. 1, which can be used by the commissioning device 1 for communication, e.g. to a central control unit, which is later used for visualizing the building technology devices in relation to locations in a building.

The commissioning device 1 may also comprise a user interface (not shown). On the user interface, the commissioning device can display a plan of the total or partial commissioning environment. After the commissioning device determined its position, it can enter the position of the building technology device 3 in the plan (e.g. floor or building plan in which devices should be commissioned) based on the spatial the position and the spatial information of three dimensions contained in the images obtained by the optical sensor 2. Through the user interface, a user can, in one embodiment, assign a position to a position on the commissioning plan, e.g. by a touch gesture on a touch display. The commissioning device may also show a scaled version and/or the shape of the imaged building technology devices in their relative spatial arrangement on the user interface. The user can then drag-and-drop the arrangement to the right position on the plan. However, preferably, the plan is defined with a geographical location, or with an offset to a specified geographical location and the commissioning device may automatically position the arrangement in the plan. It is important to note that different building technology devices in the observed area 4 can be separately identified and a separate position can be assigned to each of the building technology devices 3.

This approach is combined with the transmission of optical communication signals issued by the building technology devices 3. Optical communication signals such as VLC (visual light communication) signals are used to send information by modulating in particular visual light by a lighting means of a building technology device 3. The at least one processing unit P and or the image processing software processes the optical communication signals received from the building technology device in order to obtain information identifying the building technology device. The at least one processing unit then associates the computed spatial position of the building technology device with the processed visual signals.

Figure 2:
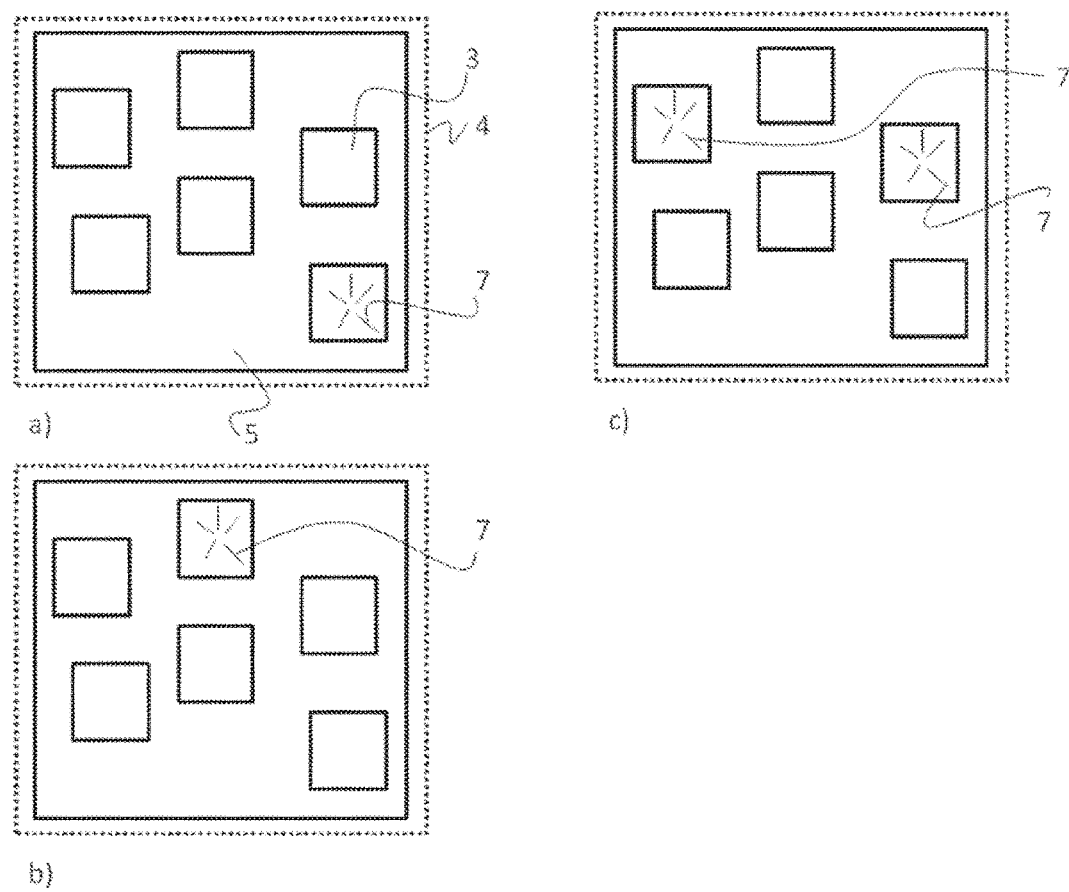
FIG. 2 shows examples of the inventive method.

FIG. 2a shows a simplified exemplarily view from the optical sensor 2. The reference signs of FIG. 1 are further maintained. The optical sensor 2 of the commissioning device 1 captures an image of the building technology devices 3 to be commissioned. The commissioning device 1 also processes optical communication signals 7 issued or generated by the building technology devices 3 (e.g. using a LED/OLED). The optical communication signals can be signals generated by an emission of e.g. PWM modulated light. In case of the building technology devices 3 being luminaires, the lighting means for emitting light can be used to emit light for issuing the optical communication signals.

In FIG. 2b another building technology device than in FIG. 2a emits an optical communication signal 7.

A software component, e.g. the image processing software, a part thereof, a separate software running on the commissioning device 1 and/or the at least one processing unit P decodes or evaluates the optical communication signals 7 emitted by the building technology devices 3. The software component and/or the at least one processing unit P especially extracts an hardware or network address (MAC address, IP address, DALI- and/or DSI bus address . . . ) from the optical communication signals 7 received by the optical sensor 2. Hence, the information signaled by the optical communication signals preferably is such an address of an emitting building technology device 3.

It is also possible that more than one building technology device 3 issues an optical communication signal 7 at the same time, as illustrated in FIG. 2c. The commissioning device then filters and associates the determined address and/or other information transmitted by the optical communication signals 7 with the geographical location determined by the commissioning device 1 for the building technology devices 3.

While the commissioning device 1 may use one or more still images containing the spatial information to determine a location of a building technology device 3, also consecutive images, e.g. a recorded film showing at least one building technology device 3 while emitting the optical communication signals 7, may be used to assign an address to a geographical location of a building technology device. It is therefore possible to put the commissioning device into a room, making a film of building technology devices in a room while they issue optical communication signals 7, and then transfer this film from the commissioning device to an external device which uses an image processing software to extract the optical communication signals issued by the building technology devices 3 and respective information from the consecutive images in the film and to assign the information with the position defined by the spatial information in the images or the movie.

However, the commissioning device 1 may also extract information from the optical communication signals 7 in real-time while taking a picture of building technology device 3 and being exposed to the optical communication signals 7 issued by the building technology device 3.

For example, a luminaire transmits visual light communication signals by modulating its light emission. The optical sensor 2 imaging the area 4 is either provided with a software component or connected to an external computing device for demodulating the visual light communication signals to associate the modulated information with the location of each building technology device or luminaire.

Hence, the communication by optical communication signals 7 is combined with special information obtained by the optical sensor 2. Also other electronic devices available on the market can be used as commissioning device such as tablets, digital cameras and so on.

Even in a digital manner, the commissioning device 1 associates the geographical location of a luminaire in association with an address, operating parameters and/or other information communicated by the building technology devices via the optical communication signals 7.

Figure 3:
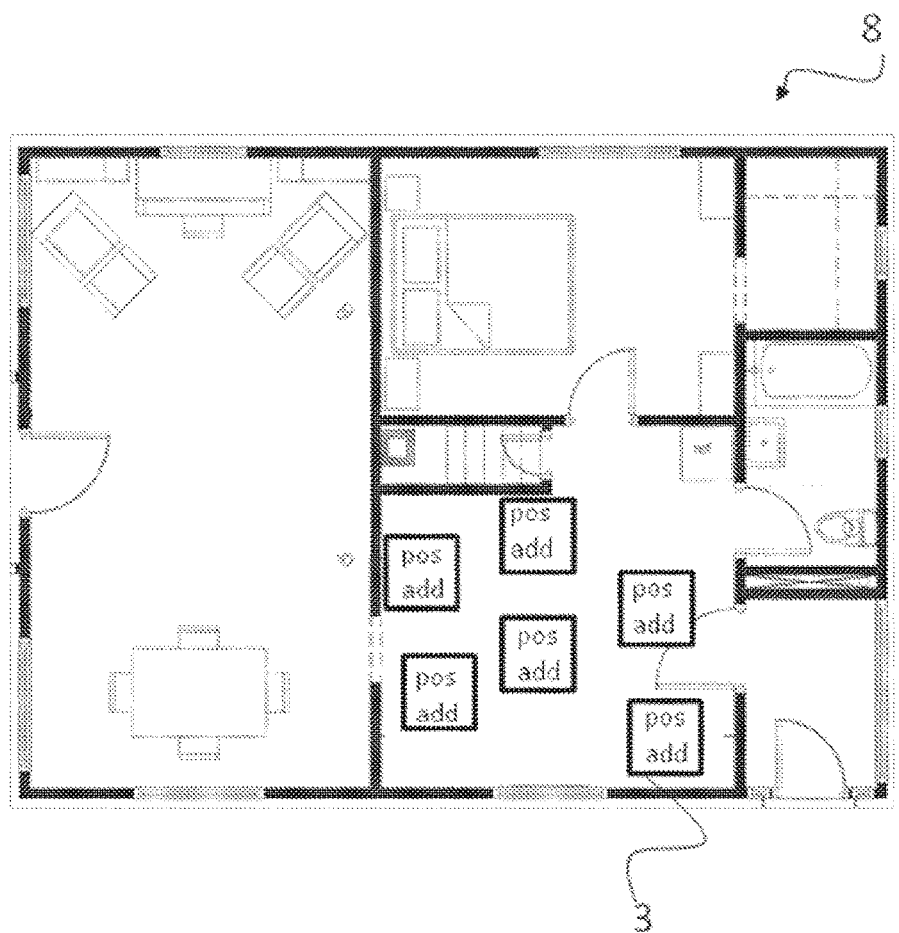
FIG. 3 depicts an exemplary application.

The invention can also be easily combined with a digital building map, as illustrated for example in FIG. 3. For example when entering a room for taking an image of the building technology devices 3 with the commissioning device 1, on a digital map 8 the associated positions "pos" of the building technology devices 3 can be marked such that the image taken from the room can be associated with a digital building map. Also an address "add" of the building technology devices 3 can be stored and/or shown.

The building technology devices 3 can be configured to emit their respective information if they are not already connected in the building network or bus system.

The environment, floor, or building plan 8 can be downloaded to the commissioning device 1, or the information obtained by the commissioning device 1 can be combined with the plan 8 in a device external to the commissioning device 1, e.g. by connecting and transferring the data obtained by the commissioning device 1 to the external device.

For example, the commissioning device 1 can be put in a room and a commissioning engineer starts the commissioning process by triggering a commissioning signal. The commissioning device 1 may then automatically receive the optical communication signals 7 issued by the building technology devices 3 in the room output in response to the commissioning signal.

Otherwise, it is also possible that the commissioning device 1 sends out e.g. a wireless or radio signal, which puts the building technology devices 3 receiving the signal into a commissioning mode in which they start emitting modulated light for optical communication. Then, the commissioning engineer can go from room to room using the plan 8 and start the commissioning in each room. For example a tablet or a smart phone can be put in the middle of the room, the optical sensor 2 can be faced to the ceiling and the process can be launched. Then the building technology devices 3, which in this case might be luminaires, can use the visual light communication to transmit their information to the commissioning device 1. The commissioning device 1 identifies the luminaires, their location and the room the commissioning device 1 is in. Afterwards a grouping or association of a scene can be done off-side. Outside the building, multiple images obtain with the commissioning device can be used to obtain a location for each building technology device 3.

What is claimed is:

1. A commissioning device for commissioning building technology devices installed on and/or in buildings, the commissioning device comprising:
a mobile handheld communication terminal;
at least one optical sensor on the mobile handheld communication terminal configured to obtain spatial images containing spatial information of three dimensions and to receive optical communication signals emitted from a plurality of building technology devices, at least one said building technology device comprising an operating device for a luminaire, and the at least one optical sensor comprising a 3D camera having a first optical lens and a second optical lens with a separate image sensor element for each lens, wherein the second optical lens observes the same area as the first optical lens from a different angle;
a positioning sensor; and
at least one processing unit configured to process received optical communication signals, to process the spatial images and to evaluate the output from the positioning sensor to determine an absolute position and an orientation of the commissioning device,
wherein the at least one processing unit is configured to compute a spatial position of the building technology device by processing the produced spatial images and by evaluating the spatial information and the determined position and orientation of the commissioning device, wherein the at least one processing unit is configured to process the optical communication signals received from the building technology device in order to obtain information identifying the building technology device, and wherein the at least one processing unit is configured to associate the computed spatial position of the building technology device with the processed optical communication signals in order to associate a physical position of the installed business technology device with a logical network and/or lighting bus address; and
further wherein the at least one processing unit further associates the associated information with a location in a digital building plan, stored in a storage unit functionally connected to the at least one processing unit.

2. The commissioning device according to claim 1, wherein the at least one processing unit decodes the received optical communication signals.

3. The commissioning device according to claim 1, wherein the optical communication signals are visual light communication signals.

4. The commissioning device according to claim 1, wherein the optical communication signals emitted by the building technology device include an address of the building technology device comprising an IP address and/or a lighting bus address.

5. The commissioning device according to claim 1, wherein the commissioning device comprises a communication interface for wired and/or wireless communication.

6. A method for commissioning building technology devices installed on or in buildings, the method comprising the steps of:
providing a plurality of an installed building technology devices comprising at least one operating device for a luminaire;
providing a 3D camera having a first optical lens and a second optical lens with a separate image sensor element for each lens, wherein the second optical lens observes the same area as the first optical lens from a different angle;
issuing a commissioning signal to the plurality of building technology devices to activate a commissioning mode in which the plurality of building technology devices emit optical communication signals;
obtaining spatial images with the 3D camera of the installed building technology devices containing spatial information of three dimensions;
determining the position and orientation of the commissioning device when the spatial images are obtained;
receiving optical communication signals with the 3D camera emitted from each building technology device;
processing the spatial images using at least one processing unit to compute a spatial position of the respective building technology device by processing the produced spatial images and by evaluating the spatial information and the determined position and orientation of the commissioning device;
using the at least one processing unit to process the optical communication signals received from the respective building technology device in order to obtain information identifying the building technology device; and
using the at least one processing unit to associate the computed spatial position of the respective building technology device with the respective processed optical communication signals.

7. A lighting system comprising at least one building technology device comprising an operating device for lighting means, and a commissioning device according to claim 1, wherein the commissioning device outputs the associated information to a central processing unit via a communication interface, further comprising a storage unit functionally connected to the commissioning device.

8. The commissioning device according to claim 1 wherein the commissioning device is configured to associate the associated information with an absolute position.

9. The commissioning device according to claim 1 wherein the commissioning device comprises a smartphone, a tablet or a smart camera.

* * * * *